United States Patent [19]

Forstbauer

[11] 4,063,143
[45] Dec. 13, 1977

[54] INVERTER ARRANGEMENT WITH TWO CONTROLLED THREE-PHASE INVERTERS

[75] Inventor: Wilhelm Forstbauer, Erlangen, Germany

[73] Assignee: Siemens Aktiengesellschaft, Berlin and Munich, Germany

[21] Appl. No.: 612,455

[22] Filed: Sept. 11, 1975

[30] Foreign Application Priority Data

Sept. 30, 1974  Germany .................... 2446635

[51] Int. Cl.² ........................................... H02P 13/20
[52] U.S. Cl. ...................... 363/40; 363/41; 363/72; 363/43
[58] Field of Search ............ 321/9 R, 9 A, 27 MS, 321/DIG. 1

[56] References Cited

U.S. PATENT DOCUMENTS

| 3,324,374 | 6/1967 | Corey | 321/9 A |
|---|---|---|---|
| 3,609,507 | 9/1971 | Beck | 321/9 A |
| 3,611,086 | 10/1971 | Mokrytzki et al. | 321/9 A |
| 3,781,615 | 12/1973 | Mokrytzki et al. | 321/DIG. 1 |
| 3,781,616 | 12/1973 | Mokrytzki et al. | 321/DIG. 1 |

FOREIGN PATENT DOCUMENTS

| 17,342 | 5/1971 | Japan | 321/27 MS |
|---|---|---|---|

*Primary Examiner*—William H. Beha, Jr.
*Attorney, Agent, or Firm*—Kenyon & Kenyon, Reilly, Carr & Chapin

[57] ABSTRACT

An inverter arrangement comprising two controlled three-phase inverters is disclosed. The inputs of these inverters are preferably connected to a common DC voltage source, while the output voltages delivered by the inverters are of rectangular waveshape and are added together by means of transformers to form resultant output voltages. In accord with the invention, in order to obtain resultant output voltages whose harmonics are of orders which do not change when voltage control is applied, all the output inverter voltages are caused to comprise in each period a positive and a negative voltage pulse, each of which pulses has breaks or no-voltage intervals of controllable width positioned at predefined places within the pulse.

5 Claims, 7 Drawing Figures

INVERTER ARRANGEMENT WITH TWO CONTROLLED THREE-PHASE INVERTERS

BACKGROUND OF THE INVENTION

1. Field of the Invention

The invention concerns an inverter arrangement comprising two controlled three-phase inverters whose inputs are preferably connected to a common DC voltage source and whose outputs deliver a first and second three-phase system of output voltages of rectangular waveform which are displaced by 120° electrical (hereinafter written as el) with respect to each other. More particularly, it concerns an inverter arrangement in which the aforesaid outputs of the two inverters are added together by means of a transformation circuit in transformer fashion to form a three-phase system of resultant output voltages, and in which at least one control unit is included for controlling the main valves of the two inverters such that all the inverter output voltages have a rectangular waveform.

2. Description of the Prior Art

The resultant output voltage of two signle-phase inverters which are connected to a common DC voltage source can be controlled by a known technique (see, e.g., Siemens-Zeitschrift October 1964, No. 10, pages 775 to 781, particularly FIG. 7 on page 779) which operates according to the principle of an electronic rotary transformer and is sometimes referred to as the tilt method. In this technique, the output voltages of both inverters are combined via two transformers connected in series on the secondary side to form a resultant output voltage whose magnitude can be changed by displacing in time the control pulses controlling the first inverter relative to the control pulses controlling the second inverter. More specifically, the output voltages of both inverters have the same amplitude and frequency and have a rectangular waveshape which includes per period a positive and a negative voltage pulse each of 180° width. By displacing the control pulses of the first inverter relative to those of the second, a phase shift between the aforesaid two output voltages occurs. As a result, combining of the two output voltages advantageously results in a rectangular resultant output voltage which is approximately sinusoidal in shape and which has an amplitude dependent upon the phase shift between the combined voltages. This resultant output voltage is also found to have low-order harmonics which for may applications, e.g., for an interruption-free power supply, especially for feeding a data processing system, are highly undesirable. Moreover, with this manner of generation, the control speed is limited since it corresponds approximately to the duration of one half-period.

In another known technique an individual inverter is controlled employing the principles of pulse width modulation (Siemens-Zeitschrift 45 (1971), No. 3, pages 154 to 161). According to this technique, a pulsed three-phase inverter generates between its output terminals a symmetrial three-phase AC voltage system whose fundamental has a predetermined frequency and a controllable amplitude. The three output voltages of the inverter each have a rectangular waveform with a number of positive and negative voltage pulses per period. Moreover, each output voltage is approximately sinusoidal in shape and comprises, in addition to a fundamental, harmonics of different frequencies.

Since the aforesaid harmonics of the output voltage are undesirable, for instance, in the operation of a three-phase machine, as they result in current harmonics which impose an additional load on the machine, the number and position of the individual voltage pulses of the output voltages are selected so that the harmonics produced are those having a minimal detrimental effect. This, in turn, is achieved by selecting the position and number of pulses so as to eliminate all lower order harmonics. If this is done the harmonic currents are then kept small by the stray reactances present in the three-phase machine itself. One technique for realizing a high fundamental content and a low lower order harmonic content is by varying the pulse widths proportionally to the instantaneous value of the fundamental. Unfortunately, with this technique, the harmonics of low order generally cannot entirely be elminated if the individual output voltages are to be controllable.

It is, therefore, an object of the present invention to provide an inverter arrangement of the aforementioned type whose resultant output voltages each have a fundamental whose magnitude can change and an harmonic content which remains constant as to the order number of its harmonics during the changes in magnitude of its associated fundamental. In other words, each of the resultant output voltages is to be controllable and should have only harmonics above a given high order which do not change in order or number during the control process.

SUMMARY OF THE INVENTION

In accordance with the present invention, the above and other objectives are accomplished in an inverter arrangement of the above type by including therein control means for controlling the main valves of the two inverters of the arrangement such that the three-phase voltage outputs of each inverter take on particular waveshape forms, and by also including therein means for combining the voltage outputs of the two inverters in a particular manner. More specifically,, the main valves of both inverters are controlled so as to be fired and extinguished several times per period, whereby each output voltage of each inverter is made to include a positive voltage pulse of 120° el length and a negative voltage pulse also of 120° el length, these pulses being separated from each other by a no-voltage interval of 60° el length and each having at a distance of 30° el from its center and on both sides thereof a no-voltage break or interval whose overall width is adjustable. Moreover, the control is such that the voltage pulses of the first system of output voltages (those from the first inverter) have magnitudes which are larger by a factor $\sqrt{3}$ than the magnitudes of the voltage pulses in the second system of output voltages (those from the second inverter) and such that the second system of output voltages is phase-shifted relative to the first system of output voltages by 30° el in the sense of a time lag. Moreover, in further accord with the invention, the combining means functions so that each one of the output voltages of the first system is combined in the sense of a voltage addition with the output voltage of the second system which is shifted 30° el relative to this one output voltage, and is additionally combined in the sense of a voltage subtraction with the output voltage of the second system which is shifted 150° el relative to this one output voltage, to thereby form one of the three resultant output voltages of the inverter arrangement.

It should be noted that there are known techniques for controlling an individual inverter in such a manner that its output voltage comprises per period a positive and a negative voltage pulse which are separated from each other by a no-voltage interval of 60° el length, are each of 120° el length and are formed so that each pulse has no-voltage breaks of adjustable width situated on both sides of its center at a distance of 30° el. (ETZ-B, vol. 20 (1968), pages 616 to 621).

With an inverter arrangement designed as aforesaid, each resultant output voltage has a frequency content which is independent of the total width of the breaks in the individual inverter output voltage pulses and, therefore, is independent of the control angle. In particular, each alway comprises twelve pulses and, as a result, includes, in addition to a fundamental, only harmonics of the order $n = (12p \pm 1)$, where $p = 1, 2, 3 \ldots$; i.e., only harmonics of the order $n = 11, 13, 23, 25 \ldots$. While the waveform of each resultant output voltage does change when the width of the breaks is controlled, i.e., the total width of the breaks is changed, the number and order of the harmonics do not change. The harmonic spectrum is thus constant as far as its order numbers $n$ are concerned. Moreover, because of the 12-pulse system content of the resultant voltages, a high control speed, and, therefore, a small statistical dead time for the voltages is achieved. Additionally, with the present inverter arrangement, the switching frequency of the individual main inverter branches is kept low.

If it is desired to have each resultant output voltage more closely approximate a sinusoidal waveform, a filter may be connected between the inverter arrangement and the load. This filter need only be designed to provide significant filtering above the lowest harmonic still present. Since no harmonics occur below the order $n = 11$, the filter may advantageously be kept small and be constructed inexpensively. The dynamic behavior of the filter is thereby also enhanced.

As already mentioned, the magnitude of the voltage pulses in the first system of output voltages (from the first inverter) should be larger by a factor $\sqrt{3}$ than the magnitude of the voltage pulses in the second system of output voltages (those from the second inverter). To realize this difference in magnitude, separate DC voltage sources with outputs differing by the factor $\sqrt{3}$ may be employed for supplying the two inverters. However, it may be more advantageous to connect the inputs of the two inverters to the same DC voltage source, which may, for instance, be a battery and to realize the difference in magnitude by employing transformers having different transformer ratios as the combining means.

More specifically, the combining means may comprise a first transformer which is connected to the output of the first inverter and a second transformer which is connected to the output of the second inverter. The former transformer may be designed with a Dy-circuit connection and the second transformer with a Dz-circuit connection with an open neutral. Additionally, the transformer ratio of the first transformer may be smaller by the factor $\sqrt{3}$ than the transformer ratio of the second transformer. The second transformer may preferably be designed with a Dz6 circuit connection.

The control means of the invention may act to adjust the total width of all the breaks in the inverter output voltage pulses together and in the same sense in the range from 0° to 30° el by feeding a DC control voltage to the control means. In such case, the control means can be of a simple design. In principle, the range may also extend from 0° to 60° el.

The total width of the individual breaks may also be controlled by a control loop included in the control means for controlling the resultant output voltages.

With the present inverter arrangement, the control means need only employ a single synchronizing signal in generating the control pulses for main valves of the two inverters. In one embodiment of the invention to be described in detail hereinafter, the control pulses are formed as a function of the points of intersection of a periodic synchronizing voltage and an adjustable DC control voltage. In particular, a symmetrical sawtooth voltage whose frequency is equal to twelve times that of the frequency of the fundamental of the resultant output voltages is employed as the synchronizing signal. Alternatively, two symmetrical sawtooth voltages which are displaced 180° el relative to each other and which have a frequency equal to six times that of the resultant output voltage may be employed. In such case, the firing pulses for the main valves of the first inverter are derived from the first sawtooth voltage, while the firing pulses for the main valves of the second inverter are derived from the second sawtooth voltage.

In the above embodiment, moreover, the control means comprises a common control unit for controlling both inverters. This unit, in turn, includes a voltage comparison member for comparing the adjustable DC control voltage with the periodic synchronizing voltage and for generating output signals if the voltages are equal. A shift register is also provided for forming switching pulses displaced relative to each other and which are applied to a shifting unit for deriving delayed switching pulses. A logic circuit, also included in the control unit, then forms, through logically interconnecting the output signals with the switching pulses and the delayed switching pulses, the firing signals for the main valves of the two inverters.

It has been found that a minimum of components need be employed in the control unit if the switching pulses delivered by the shift register are each of 30° el length and are successively displaced relative to each other by 30° el; if the delayed switching pulses delivered by the shifting unit are also each of 30° el length and are successively displaced relative to each other by 30° el; and finally if each delayed switching pulse is always phase-shifted by 15° el in the sense of a time lag relative to its corresponding undelayed switching pulse.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
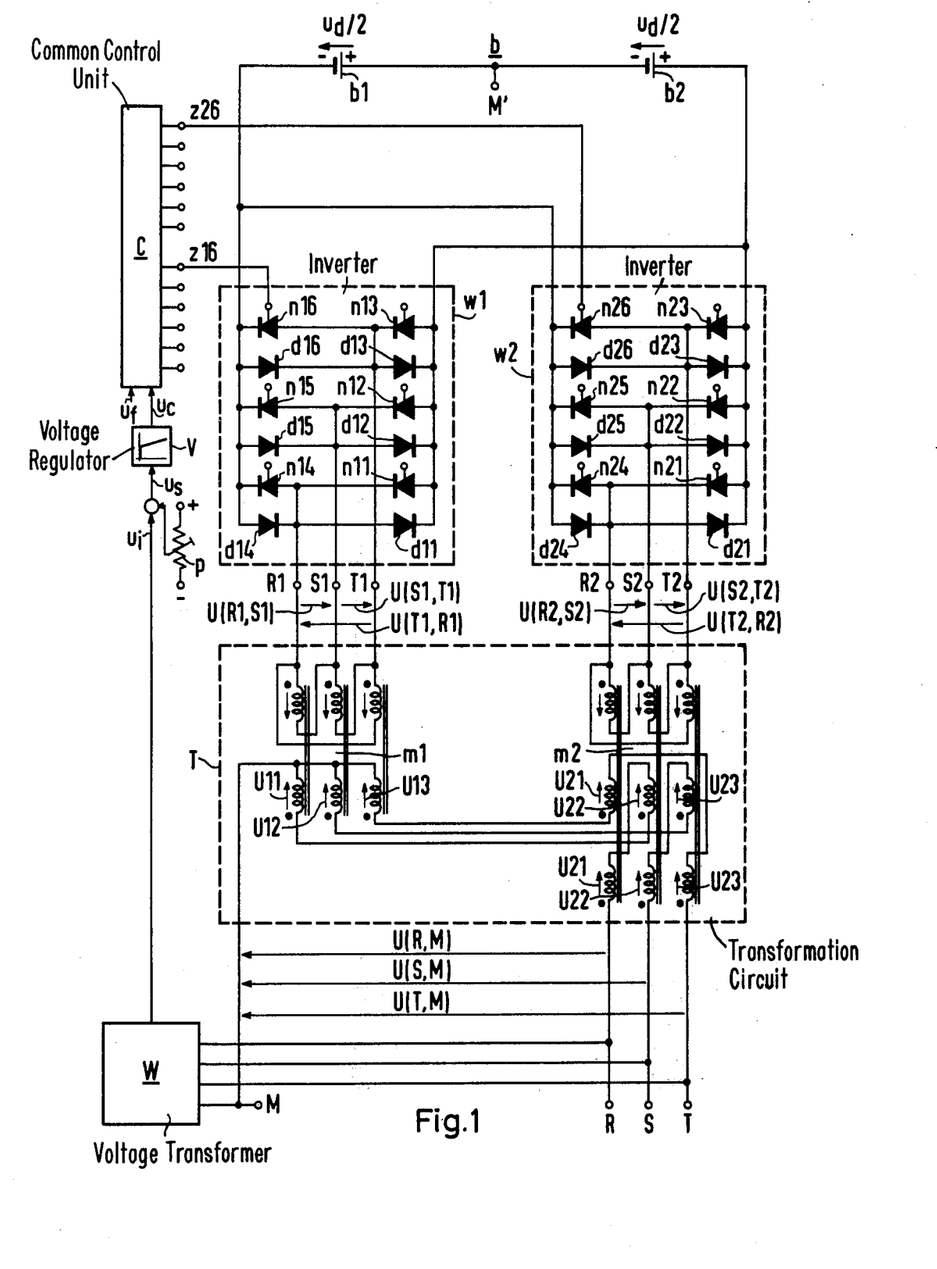
FIG. 1 shows an inverter arrangement in accordance with the principles of the present invention.

The inverter arrangement of FIG. 1 comprises first and second three-phase inverters $w1$ and $w2$, which are both connected on the input side to the same DC voltage $u_d$. The DC voltage $u_d$ may be variable and is supplied by a DC voltage source $b$, which is illustratively shown as being divided at a center point M' into two subvoltage sources $b1$ and $b2$ of the same subvoltage $u_d/2$. In practice, the source $b$ may be a battery or also a controlled rectifier with a choke and a filter capacitor and, optionally, with a buffer battery in the output circuit.

As shown, the inverters $w1$ and $w2$ are formed in a well-known manner and comprise groups of six controlled main valves $n11$ to $n16$ and $n21$ to $n26$, respectively, each group being arranged in a three-phase bridge circuit. Connected antiparallel to the main valves $n11$ to $n26$, which valves typically might be thyristors, are recovery diodes $d11$ to $d26$. With the inverters $w1$, $w2$ so configured, they supply a first and a second three-phase system of output voltages which are displaced 120 electrical degrees relative to each other.

Both the inverters $w1$ and $w2$ are additionally provided with conventionally designed commutation devices which include quenching capacitors and may additionally include controlled quenching valves. For the sake of clarity, these commutation devices have not been specifically illustrated in the drawings.

In the present case the commutation devices employed must be designed such that the main valves of the series-connected main branches of a leg of an inverter can alternatingly be fired and extinguished at will without causing a commutation short circuit. Thus, for example, the main valve $n16$, which is shown in the first inverter $w1$ at the upper left, must be extinguishable as many times as desired in one period, before the main valve $n13$, which is connected in series with it and is shown next to it to the right, is fired immediately following it, and vice versa. To meet such requirements, known commutation devices of a type having individual quenching or with push-pull quenching (Siemens-Zeitschrift 43 (1969), No. 11, pages 88 to 893) can be employed. If transistors are used as the controlled main valves $n11$ to $n16$ and $n21$ to $n26$, a separate commutation device can be dispensed with, as these components can be switched on and off at will in each period up to their maximum switching frequency.

The respective three output voltages R1, S1, T1 and R2, S2, T2 derived from the inverters $w1$ and $w2$ are applied to a transformation circuit T which includes two three-phase transformers $m1$ and $m2$ of different transformer ratios. In the transformation circuit T the output voltages of both inverters $w1$ and $w2$ are added together to form resultant output voltages which appear at the phase terminals R, S, T.

As illustrated in FIG. 1, the first inverter $w1$ is connected on the AC side to the first transformer $m1$ which is constructed with a so-called Dy-connection. Specifically, a Dy5 connection is shown in the figure. The neutral of the transformer $m1$ is brought out from the transformer to form a neutral conductor terminal M, the latter terminal being the neutral terminal for the phase terminals R, S, T. The second transformer $m2$, to which the second inverter $w2$ is connected on the AC side, is connected in a Dz circuit connection, specifically shown as a Dz6 connection, with an open neutral. Instead of a Dz6 connection, a Dz0 connection can also be used for the transformer $m2$. In such case, a Dy11 connection must be chosen for the transformer $m1$. In general, therefore, transformer circuits must be used at the output of both inverters $w1$, $w2$, one of which has a neutral point that can be opened up or brought out so that it can be connected to the other transformer circuit, and one of which is designed with a Dy and the other with a Dz connection. The aforementioned types of transformer connections are explained in detail in Specification 0532 of the Verband Deutscher Elektrotechniker (VDE).

As seen from FIG. 1, the primary windings of both transformers $m1$ and $m2$ are delta-connected. On the secondary side, one secondary winding is arranged on each leg of the transformer $m1$ and first and second secondary windings are arranged on each leg of the transformer $m2$. The latter secondary windings of the transformer $m2$ are, in turn, interconnected such that each second secondary winding is connected in series opposition with a first secondary winding of an adjacent leg. Also on the secondary side, the two transformers $m1$ and $m2$ are connected in such a manner that each series circuit of two secondary windings of the transformer $m2$ is connected in series with a secondary winding of the transformer $m1$. More specifically, the secondary winding of the left leg of the transformer $m1$ is connected in opposition with the first secondary winding of the middle leg of the transformer $m2$ and at the same time in the same sense with the second secondary winding of the left leg of such transformer. Similarly, the middle secondary winding of the transformer $m1$ is connected in opposition with the first secondary winding of the right leg of the transformer $m2$ and at the same time in the same sense with the second secondary winding of the middle leg of the latter transformer. Finally, the right secondary winding of the transformer $m1$ is similarly connected in opposition with the first secondary winding of the left leg and in the same sense with the second secondary winding of the right leg of the transformer $m2$. The aforesaid opposite and same sense connections between the secondary windings of the transformers $m1$ and $m2$ can be observed from the dots marked at the individual windings.

Each of the above-described overall series circuits of transformer windings is connected at one end to the neutral conductor terminal M and at the other end to a different one of the phase terminals R, S, T. As can be seen, these other ends of the overall series circuits are the output terminals of the transformer $m2$. Between these latter terminals, which are connected directly to the phase terminals, R, S, T, and the neutral terminal M a symmetrical three-phase system of resultant output voltages is available for supplying a load (not shown). The load may, for instance, be an AC network or some other type of component which has an inductive and an ohmic load component. Moreover, the load may take the form of a data processing system or a number of three-phase motors.

A common control unit C is provided for firing all the main valves $n11$ to $n16$ and $n21$ to $n26$ of the inverters $w1$ and $w2$. For the sake of clarity, only the connecting lines between the main valves $n16$ and $n26$, respectively, and the control unit C, via which the firing signals $z16$ and $z26$ are applied are specifically shown for the two inverters $w1$, $w2$. If controlled quenching valves are provided in the commutation devices of the inverters w1, w2, the control unit C also delivers control pulses to these quenching valves.

As will be explained in greater detail with reference to FIGS. 5 to 7, the control unit C forms a periodic analog synchronizing signal, from which the control signals for the main valves n11 to n16 and, likewise, for the main valves n21 to n26, are derived as a function of a DC control voltage $u_c$ being fed into the unit. With such a synchronizing signal, the control signals derived cause the individual main valves n11 to n16 and n21 to n26 to be fired and extinguished several times per period.

The frequencies $u_1$ and $u_2$ of the inverters w1 and w2, respectively, can be jointly set by a frequency control voltage $u_f$ being fed to the control unit C or may be controlled in dependence on other variables. The control angle $\alpha/2$ can be varied via the DC control voltage $u_c$ and, thereby, the magnitude of the resultant output voltage can be set. The control angle $\alpha/2$ is in general, proportional to the DC control voltage $u_c$. The DC control voltage $u_c$ can, in turn, be controlled in dependence on other variables or, as shown in FIG. 1, can be controlled by a servo-type control loop.

In the inverter arrangement shown in FIG. 1, the magnitude of the resultant output voltages at the transformation circuit T is held constant by means of a voltage control loop. The resultant output voltages are, thus, independent of fluctuations of the DC voltage $u_d$ and of load transients. In the voltage control loop, the actual value of the resultant output voltages is first determined by means of a voltage transformer W connected to the phase terminals R, S, T. This actual voltage value $u_i$ is then compared with a voltage reference value $u_s$, which reference is set by a reference value transmitter P, illustratively shown as a potentiometer P, and the companson applied to the input of a voltage regulator V. The voltage regulator V delivers, as a function of the control deviation, a DC control voltage $u_c$, which is fed to the control unit C. Thus, the control angle $\alpha/2$ is controlled as a function of the DC voltage $u_c$. If an actual voltage value $u_i$ occurs which deviates from the set voltage reference voltage $u_s$, the resultant output voltage is readjusted via the control angle $\alpha/2$ until the actual voltage value $u_i$ has again reached the voltage reference value $u_s$.

The manner in which the resultant output voltages at the terminals R, S, T of the inverter arrangement are added together by means of voltage transformer W will be explained with reference to the voltage-vs-time diagrams shown in FIGS. 2 and 3. In these diagrams, the time or phase-angle axis $wt$, is shown at the top and extends over a full period of the fundamental of the resultant output voltages, i.e., from 0° to 360° el.

Figure 2:
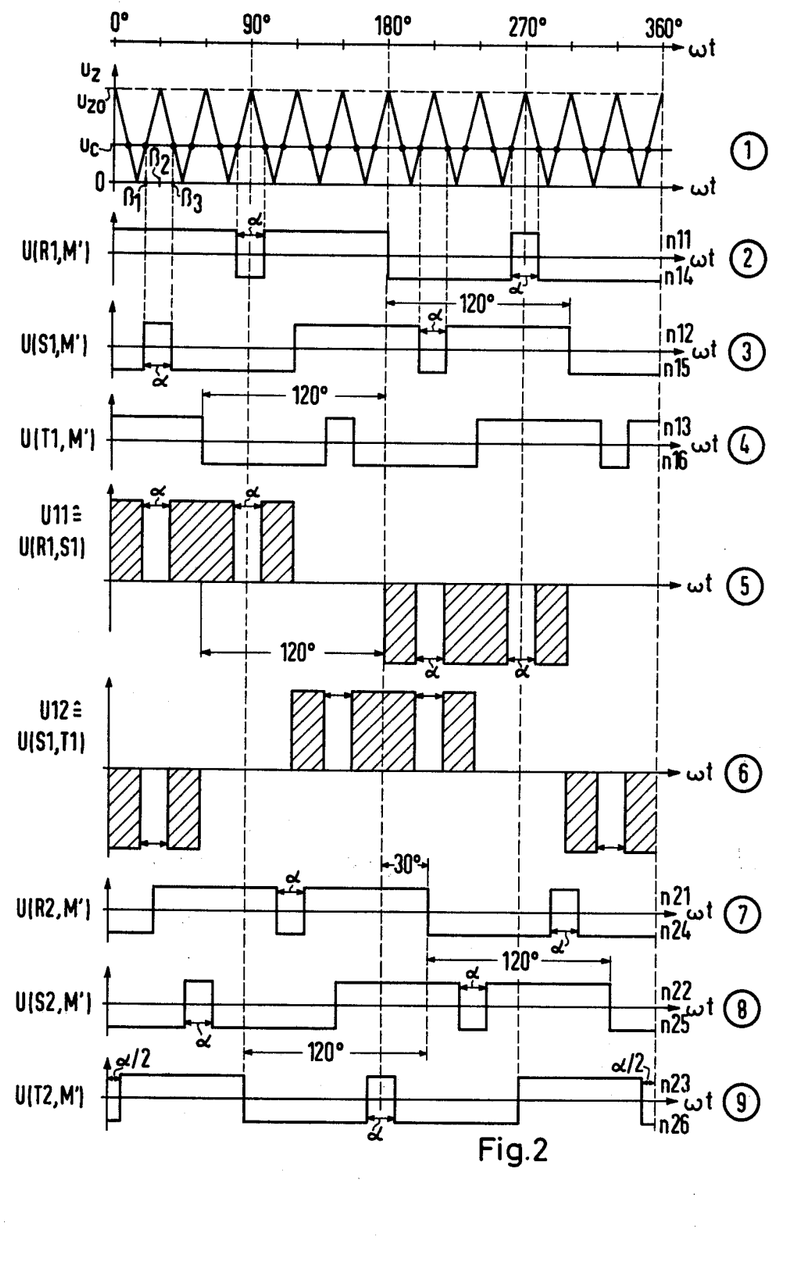
FIG. 2 illustrates various signals present in the inverter arrangement of FIG. 1.

As shown in FIG. 2, a periodic synchronizing voltage, illustratively depicted as a symmetrical sawtooth voltage $u_z$, is compared with the adjustable DC control voltage $u_c$. The sawtooth voltage $u_z$ has flanks that rise and decay linearly with time, a peak value $u_{zo}$ and a frequency which is 12 times that of the fundamental of the resultant output voltage of the inverter arrangement. If the sawtooth voltage $u_z$ and the DC control voltage $u_c$ have the same value, which is the case at the darkened points shown in the waveshape of diagram 1 of FIG. 2, then a switching flank is formed in a voltage comparison member (not shown) of the control unit C. The voltage comparison member generates a squarewave voltage (not shown) which has, for instance, a decaying switching flank for the electrical angles $B_1 = q \cdot 30° - \alpha/2$ and a rising switching flank for the electrical angles $B_3 = q \cdot +° + \alpha/2$, where q is 0, 1, 2, 3 . . . . One thus obtains a squarewave voltage (not shown) with twelve times the fundamental of the resultant output voltages. The switching flanks of this squarewave voltage are symmetrically situated relative to the angles $B_2 = q \cdot 30°$. Each angle $B_2$ designates a break. The breaks at the points $B_2$ have a total width $2 \cdot \alpha/2$, which is in the range from 30° el, corresponding to the magnitude of the DC control voltage, which may be in the range from 0 V to the peak value $u_{zo}$. If the control voltage $u_c$ has assumed, for instance, the magnitude of the peak value $u_{zo}$, then the total width is $\alpha = 0°$ el. A reduction of the DC control voltage $u_c$ from the peak value $u_{zo}$ then results in an increase of the total width $\alpha$ and, therefore, of the control angle $\alpha/2$.

From this squarewave voltage (not shown), the control pulses both for the controlled main valve n11 to n16 of the inverter w1 and for the controlled main valves n21 to n26 of the inverter w2 are formed by a suitable electronic counter and distributor circuit (not shown) included in the unit C. The control pulses are formed so that at the outputs R1, S1, T1 of the first inverter w1 the AC voltages U(R1, M'), U(S1, M') and U(T1, M') are developed, as measured relative to the assumed center M' of the DC voltage source b.

The waveforms of the AC voltages U(R1, M'), U(S1, M') and U(T1, M') are plotted over 360° el in the diagrams 2 to 4 of FIG. 2. Each voltage comprises a number of positive and negative rectangular voltage pulses and each is of the same geometrical shape. However, the voltages are phase-shifted with respect to each other by 120° el. The AC voltage U(R1, M'), for instance, comprises a positive voltage pulse which extends from 0° to 180° el and into which is symmetrically inserted at the point 90° el a negative voltage pulse of the same height and the width $\alpha$. Additionally, it comprises a negative voltage pulse which extends from 180° to 360° el and into which a positive voltage pulse of the same height and the width $\alpha$ is symmetrically inserted at the point 270° el. The width of the two inserted voltage pulses is, therefore, $\alpha$ in each half period. The width $\alpha$ can be adjusted by means of the DC control voltage $u_c$. As aboveindicated, the AC voltages U(S1, M') and U(T1, M') in each period are replicas of the waveform U(R1, M') shifted in phase 120° el. As shown, the voltage U(S1, M') is shifted 120° el to the right and the voltage U(T2, M') 120° el to the left relative to the AC voltage U(R1, M'). The respective main valves n11 to n16 fired by the voltages U(R1, M'), U(S1, M'), U(T1, M') are indicated to the extreme right next to the respective diagrams 2 to 4.

The control pulses for the main valves n21 to n26 of the second inverter w2 are also formed from the above-mentioned squarewave voltage by other suitable electronic counter and distributor circuits (not shown) also included in the control unit C. These control pulses are formed in such a manner that at the outputs R2, S2, T2 of the second inverter the AC voltages U(R2, M'), U(S2, M') and U(T2, M') are developed as measured relative to the assumed center M' of the DC voltage source b. These latter voltages are plotted in diagrams 7 to 9 of FIG. 2. It can be seen from these diagrams that the individual AC voltages U(R2, M'), U(S2, M') and U(T2, M') are composed of individual voltage pulses and are replicas of one another phase-shifted by 120° el. It will further be seen that they are also phase-shifted replicas of the AC voltages U(R1, M'), U(S1, M') and U(T1, M') in the diagrams 2 to 4. As shown, the AC voltage U(R2, M') is phase-shifted to the right by 30° el relative to the AC voltage U(R1, M'), as is the AC voltage U(S2, M') relative to the AC voltage U(S1, M') and the AC voltage U(T2, M') relative to the AC voltage U(T1, M'). Moreover, the AC voltage U(R2, M') is illustrated as comprising in each 360° el period the following voltage pulses: a negative voltage pulse which extends from 0° to 30° el; a positive voltage pulse which extends from 30° to 210° el and into which at the point 120° el a negative voltage pulse is inserted; and a negative voltage pulse which extends from 210° to 360° el and into which a positive voltage pulse is inserted at the point 300° el. As before, the widths of the symmetrically inserted positive and negative voltage pulses are adjustable and equal to $\alpha$. Also, as before, the respective main valves $n21$ to $n26$ fired by these voltages are noted at the extreme right next to the respective diagrams 7 to 9.

If the voltage pulses in the diagrams 2 to 4 and the diagrams 7 to 9 of FIG. 2 are positive pulses, the main valves $n13$, $n21$, $n11$ or $n23$, $n22$, $n21$ situated on the positive side of the DC voltage source have been fired (see FIG. 1); if, on the other hand, the pulses are negative, the main valves $n16$, $n15$, $n14$ or $n26$, $n25$, $n24$ situated on the negative side, have been fired. At the points indicated, all the voltage pulses of the opposite polarity inserted per period can be varied uniformly and in the same sense over a control angle range $0° \leq 2 \cdot \alpha/2 \leq 30°$ el as to their width $\alpha$ by means of the DC control voltage $u_c$. FIGS. 2 and 3, by way of an example, apply for a control angle $\alpha/2 = 9°$ el.

The output voltage U(R1, S1), measured as the line voltage between the outputs R1, S1 of the first inverter $w1$, is obtained by taking the difference between the AC voltages U(R1, M') and U(S1, M') shown in diagrams 2 and 3, respectively, of FIG. 2. The output voltage U(R1, S1) is plotted in FIG. 2 as diagram 5. As can be seen, it comprises for each period a positive voltage pulse which extends from 0° to 120° el, and a negative voltage pulse which extends from 180° to 300° el. Each voltage pulse, thus, has a length of 120° el and is separated from the other by a no-voltage interval of 60° el length. The positive voltage pulse has two breaks or no-voltage intervals of the same adjustable total width $\alpha$. It is thereby subdivided into three rectangular subpulses of adjustable width. The two breaks are centered at the points 30° and 90° el, respectively, and, thus, are symmetrically arranged relative to the center of the positive voltage pulse. The negative voltage pulse likewise, has two breaks or no-voltage intervals of adjustable width $\alpha$. These breaks are centered at the points 210° and 270° el, respectively, and, hence, are also symmetrically situated relative to the center of the negative voltage pulse. The latter pulse is, therefore, also subdivided into three adjustable width subpulses. The absolute value of the height of all six subpulses per period is the same.

As above-indicated, the total width $\alpha$ of each of the four breaks in the pulses of the voltage U(R1, S1) can be adjusted within the range between 0° and 30° el. Also, as above-indicated, the width $\alpha$ is indicative of twice the control angle $\alpha/2$. For the case when $\alpha = 0°$, one obtains two unbroken voltage pulses of 120° el length and for the case $\alpha = 30°$, six individual needle pulses of infinitesimal width. By varying the total width within the limits given, the mean value of the fundamentals of the output voltage U(R1, S1) can be varied.

Similarly, the output voltage U(S1, T1) of the first inverter $w1$ is obtained by taking the difference between the AC voltage waveforms U(S1, M') and U(T1, M') shown in the diagrams 3 and 4 of FIG. 2. The output voltage U(S1, T1) is shown in diagram 6 of FIG. 2. It is essentially a replica of the waveform U(R1, S1) shifted in phase to the right by 120° el. The two output voltages U(R1, S1) and U(S1, T1) also appear with the correct phase in the left and middle secondary windings, respectively, of the transformer $m1$ as the AC voltages U11 and U12.

The corresponding output voltage U(T1, R1) is likewise obtained by taking the difference between the AC voltages U(T1, M') and U(R1, M'). This voltage is not specifically shown.

The output voltage U(R2, S2) of the second inverter $w2$ is also derived in a similar manner as the above voltage. In particular, it is obtained by differencing the AC voltages U(R2, M') and U(S2, M') shown in diagrams 7 and 8 of FIG. 2. The resultant output voltage U(R2, S2) is plotted in diagram 10 of FIG. 3 and, as can be seen, is a replica of the output voltage U(R1, S1) phase-shifted to the right by 30° el. More specifically, U(R2, S2) comprises a positive and a negative voltage pulse per period which are separated from each other by an interval of 60° el. The positive voltage pulse extends from 30° to 150°0 el and the negative voltage pulse extends from 210° to 330° el. At the points 60° el and 120° el, as well as 240° el and 300° el, these two voltage pulses have symmetrical breaks or no-voltage intervals also of a total width equal to $\alpha$. This total width $\alpha$ can be adjusted jointly for all four breaks and, preferably, together with the total width $\alpha$ of the breaks of the output voltage U(R1, S1). By varying the total width $\alpha$ within the limits $\alpha = 0°$ and $\alpha = 30°$ the mean value of the fundamental of the output voltage U(R2, S2) can be adjusted.

Figure 3:
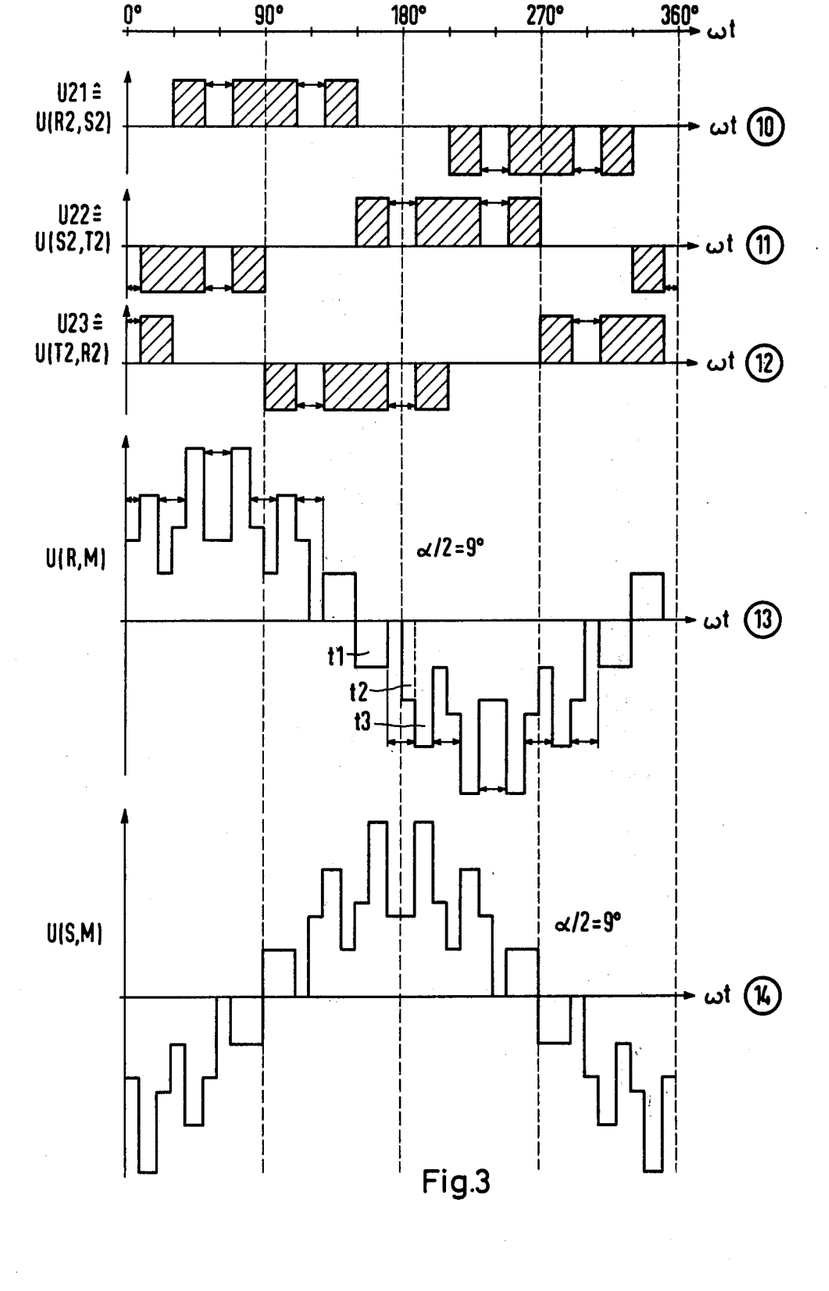
FIG. 3 shows additional signals appearing in the inverter arrangement of FIG. 1.

The output voltage U(S2, T2) of the second inverter $w2$, which is plotted in FIG. 3 in diagram 11, is derived by subtracting the AC voltages U(S2, M') and U(T2, M') shown in diagrams 8 and 9 of FIG. 2. The waveform of the output voltage U(S2, T2) corresponds to or is a replica of the output voltage U(R2, S2) and is phase-shifted relative to it by 120° el to the right.

In diagram 12 of FIG. 3 the output voltage U(T2, R2) is plotted. This voltage corresponds to the difference between the AC voltages U(T2, M') and U(R2, M') shown in diagrams 9 and 7 of FIG. 2, respectively. It is shifted by 120° el to the left relative to the output voltage U(R2, S2) and is a replica of the latter.

The output voltages U(R2, S2), U(S2, T2) and U(T2, R2) appear with the correct phase as the AC voltages U21, U22 and U23, respectively, at the first and second secondary windings of the transformer $m2$, if the neutral point of the latter, is short-circuited. Moreover, by connecting the open neutral-point terminals of the transformer $m2$ on the secondary side with the output terminals of the transformer $m1$ in the manner shown in FIG. 1, one obtains the resultant output voltage U(R, M) as a Y-voltage as follows:

$$U(R, M) = U21 - U22 + U11.$$

The waveform for the latter voltage for the control angle $\alpha/2 = 9°$ el is shown in diagram 13 of FIG. 3. As can be seen, to a large degree, the waveform approximates a sinusoidal shape.

Similarly, the resultant output voltage U(S, M) is obtained as a Y-voltage and is given as follows:

$$U(S,M) = U22 - U23 + U12.$$

U(S,M) is also plotted for the control angle $\alpha/2 = 9°$ el in diagram 14 of FIG. 3. As is apparent, the voltage U(S, M) is phase-shifted by 120° el to the right relative to the voltage U(R, M), but is otherwise a replica of the latter voltage. The remaining resultant output voltage U(T, M), which is not specifically shown is also a replica of the voltage U(R, M), but is phase-shifted by 120° el to the left. U(T, M) is derived from the following equation:

$$U(T, M) = U23 - U21 + U13.$$

At the output of the transformer circuit T one, therefore, obtains a symmetrical three-phase AC voltage system comprising the three resultant output voltages U(R, M), U(S, M) and U(T, M), each of which to a large extent approximates a sinusoidal waveform. More particularly, in each positive and negative half-period, each comprises thirteen individual subpulses of rectangular waveshape, different height, and variable width. Moreover, every 30° el there is a point from which the width of the individual subpulses can be changed uniformly.

It is to be noted at this time that with increasing control angle $\alpha/2$ the width of the one subpulse may increase, while the width of an adjacent subpulse may decrease. In diagram 13 of FIG. 3, for example, the width of the first negative subpulse t1 decreases with increasing control angle $\alpha/2$, while the adjacent second negative subpulse t2 increases at the expense of the third negative subpulse t3.

It had been assumed at the outset that both the inverters w1, w2 were connected to the same DC voltage $u_d$. From a comparison of the diagrams 5 and 6 in FIG. 2 and the diagrams 10, 11 and 12 in FIG. 3, it is evident however, that the amplitudes of the output voltages U(R1, S1) and U(S1, T1) of the first system have greater values than the amplitudes of the output voltages U(R2, S2), U(S2, T2) and U(T2, R2) of the second system. The amplification factor is $\sqrt{3}$ and is realized by selecting a different transformation ratio (input voltage to output voltage) for the two transformers m1 and m2. If the transformer m1 has the transformation ratio 1, then the transformer m2 must have the transformation ratio $1/\sqrt{3}$.

In general, the following statements can be made from the foregoing. The second system of output voltages U(R2, S2), U(S2, T2), U(T2, R2) are phase-shifted by 30° el in the sense of a time lag relative to the first system of output voltages U(R1, S1), U(S1, T1) U(T1, R1), respectively. Moreover, each particular output voltage of the first system is combined in the sense of a voltage addition with that output voltage of the second system which is phase-shifted by 30° el relative to such particular first system output voltage, and, at the same time, is also combined in the sense of a voltage subtraction with that voltage of the second system which is phase-shifted by 150° el relative to such first system output voltage. The result of this combination of voltages, in turn, is one of the resultant output voltages appearing at the outputs R, S and T. For example, the output voltage U(R1, S1) of the first system is combined in an additive sense with the output voltage U(R2, S2) of the second system, the latter voltage being phase-shifted 30° el relative to the voltage U(R1, S1), while the voltage U(R1, S1) is simultaneously a subtractive sense with the output voltage U(S2, T2), the latter voltage being phase-shifted 150° el relative to the voltage U(R1, S1). The combination of voltages, in turn, form the voltage U(R,M) appearing at point R.

It should be noted also that what has been said above with respect to the first and second systems of voltages U(R1, S1), U(S1, T1) and U(T1, R1) and U(R2, T2), U(S2, T2) and U(T2, R2) applies equally as well, taking into consideration the differing transformation ratios of the transformers m1 and m2, to the two systems of voltages U11, U12 and U13 and U21, U22 and U23.

From diagrams 13 and 14 of FIG. 3, it is evident that each of the resultant output voltages U(R, M) and U(S, M) has a 12-pulse voltage waveshape. This voltage waveshape includes for each control angle $\alpha/2$, in addition to a fundamental, only harmonics of the order $n = (12p \pm 1)$, where $p = 1, 2, 3 \ldots$, i.e., only harmonics of the order 11, 13, 23, 25 ... etc. Harmonics of so high an order are not considered as detrimental in most applications. If the control angle $\alpha/2$ is changed, only the amplitude of the fundamental and the amplitudes of these harmonics change, and no harmonics of a different order are added. The number of the orders is, therefore, constant over the entire range of the control angle $\alpha/2$.

In order to reduce the magnitude of the aforesaid harmonics, a filter arrangement (not shown) of inductances and capacitances or also of active filters may be disposed between the inverter of FIG. 1 and the load being fed thereby. This filter may be designed so as to reduce the harmonic content of the resultant output voltage below the level required by a particular application as, for example, less than 5%.

Because of the high pulse content of the resultant output voltages U(R, M), U(S, M) and U(T, M), a high control speed is achieved with the present inverter arrangement. In other words, if a disturbance occurs, this disturbance can be substantially counteracted by changing the total width $\alpha$ of the next break in the individual output voltages. It is, therefore, not necessary to wait for a full period to end in order to compensate for the disturbance. This results in a small static dead time for the control system and, as a result, the control loop of the system acts quickly to correct any disturbances which may arise.

Figure 4:
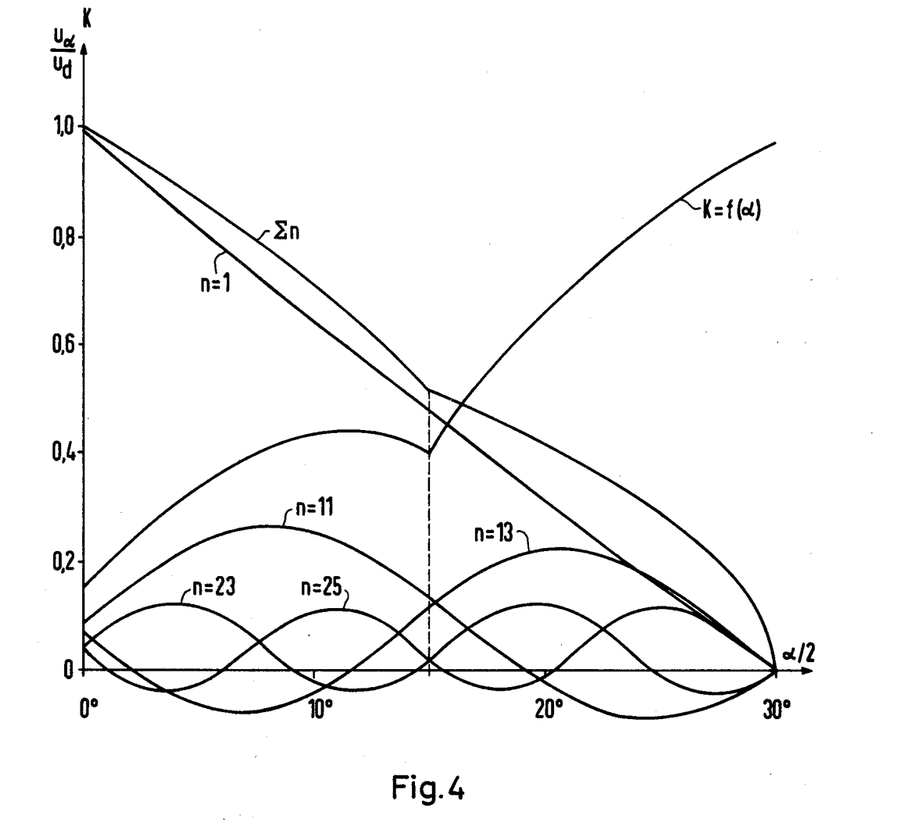
FIG. 4 depicts the waveforms of the fundamental and the harmonics, as well as the distortion, of the resultant output voltages of the inverter arrangement of FIG. 1 plotted as a function of the control angle.

In FIG. 4 are plotted the r.m.s. values of the frequency components forming the resultant output voltage U(R, M), U(S, M) or U(T, M). In particular, the r.m.s. values, normalized with respect to the DC voltage $u_d$, of the fundamental and the 11th, 13th, 23rd and 25th harmonics are plotted as a function of the control angle $\alpha/2$. Also plotted as a function of $\alpha/2$ is the curve of the distortion K. From these curves, it can be seen that the amplitude of the fundamental (curve for $n = 1$) decreases practically linearly with increasing control angle $\alpha/2$. It can also be seen that, while the distortion K increases with increasing control angle $\alpha/2$, no additional harmonics appear other than those indicated.

As above-mentioned, in the inverter arrangement of FIG. 1, the three AC output voltages U(R, M), U(S, M) and U(T, M) are controlled together. Such joint control, however, is applicable primarily in the case of a symmetrical load. In other cases individual phase control can be used. For this purpose, three single-phase inverter arrangements can be equipped with a voltage control loop. Each of these single-phase inverter arrangements may comprise two single-phase inverters which deliver AC voltages according to diagrams 5 and 10. The central symmetry of the fundamental is thus retained, thereby maintaining the twelve-pulse system of the phase voltage.

Figure 5:
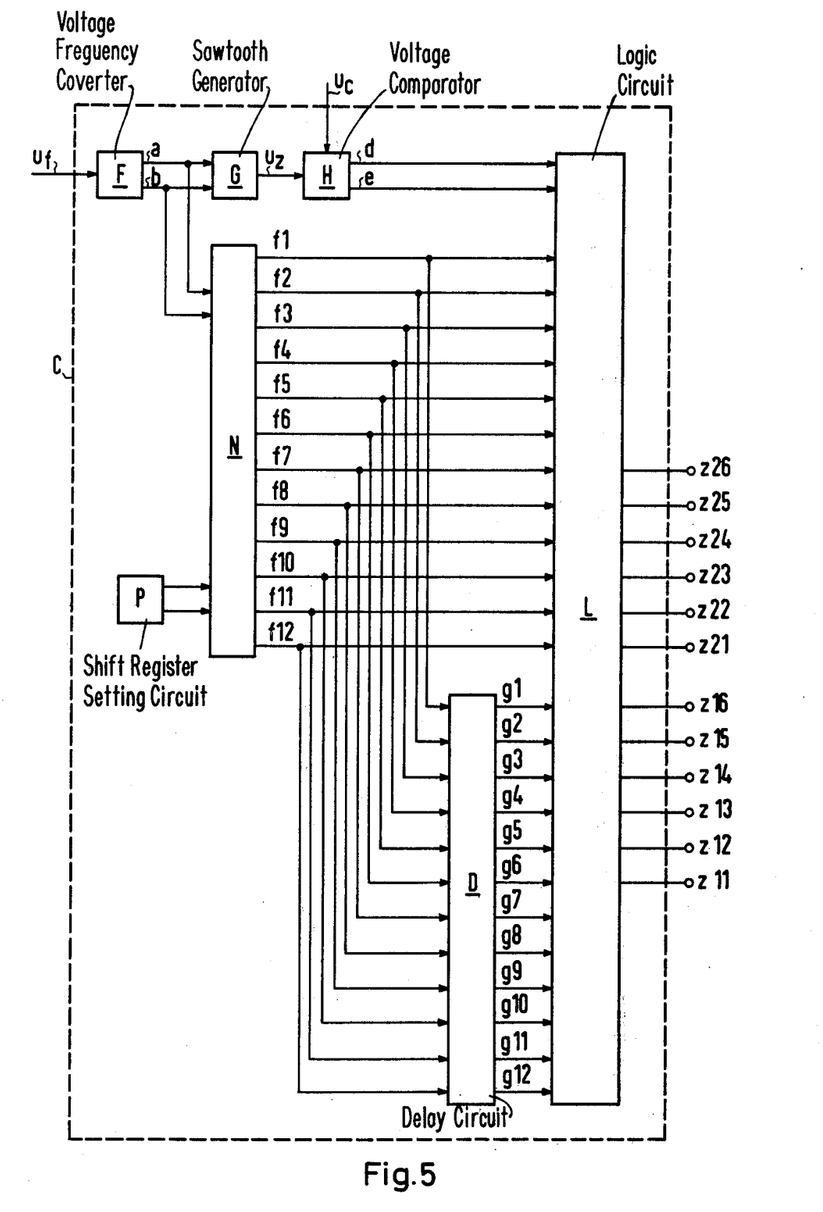
FIG. 5 illustrates in greater detail a block diagram of the control unit of the inverter of FIG. 1.

In FIG. 5 an illustrative example of the control unit C is schematically illustrated. As above-noted, the unit C serves to form the firing signals $z11$ to $z16$, as well as $z21$ to $z26$ for the main valves of the two inverters $w1$ and $w2$. In FIGS. 6 and 7, the waveforms of the signals present within the unit C are shown one below the other.

Figure 6:
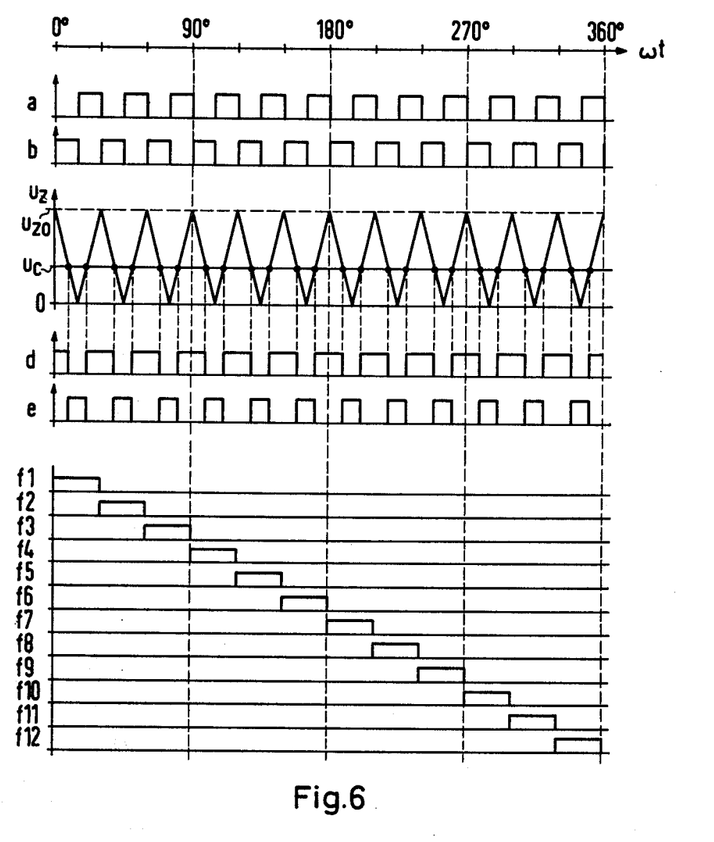
FIG. 6 shows the waveforms of signals present in the control unit of FIG. 5.

More specifically, as shown in FIG. 5, the frequency control voltage $u_f$ is fed to a voltage-frequency converter F which delivers two mutually inverse rectangular output signals $a$ and $b$ (see FIG. 6). The frequency of these output signals $a$ and $b$ is equal to 12 times the fundamental of the resultant output voltages and is adjustable, as is the phase of the signals, by changing the frequency control voltage $u_f$. Both output signals $a$ and $b$ are fed to a sawtooth generator G from which is derived the symmetrical sawtooth voltage $u_z$ which serves as the periodic synchronizing voltage. The sawtooth voltage $u_z$, which likewise has a frequency twelve times that of the resultant output voltages, is fed to one input of a voltage comparison member H. The other input of this voltage comparison member H is fed by the DC control voltage $u_c$ which, as above-noted, may be proportional to the resultant output voltage of the inverter arrangement. In the member H, which preferably includes an amplitude limiter, the two input voltages $u_z$ and $u_c$ are compared with each other to thereby derive the intersection points of the DC control voltage $u_c$ and the rising and decaying flanks of the sawtooth voltage $u_z$. As can be appreciated, these intersection points have a separation which is in the range from 0° to 15° el and which is adjustable as a function of the control voltage $u_c$.

Having derived such points, the voltage comparison member H generates two mutually inverse, pulse-shaped rectangular output signals $d$ and $e$ which are dependent thereon. In particular, at each of these points of equality of the voltages $u_z$ and $u_c$, the two output signals d and e have switching flanks which are inverted (H → L; L → H). Each switching flank of each signal is, therefore, coincident in time with an intersection point. The output signals d and e both have a frequency which is six times that of the fundamental of the resultant output voltage U(R, M) and both have a variable pulse width. Moreover, after generation they are both fed to a logic circuit L.

The output signals a and b of the voltage-frequency converter F are fed not only to the sawtooth generator G, but also to a shift register N. At the latter, twelve switching pulses $f1$ to $f12$ are formed successively. These pulses are fed via twelve separate lines to the logic circuit L and additionally to a shifting unit D. The individual switching pulses $f1$ to $f12$, of which only one is formed per period and per channel, are generated such that they are always mutually displaced by 30° el for every frequency of the output signals $a$, $b$. Moreover, they are formed such that each is of 30° el length. In the shifting unit D, each switching pulse $f1$ to $f12$ is shifted 15° el to the right, i.e., is delayed while retaining its length of 30° el. Thus, at the outputs of the shifting unit, a set of delayed switching pulses $g1$ to $g12$ are available. These delayed pulses are also fed into the logic circuit L.

In addition to being fed by the signals a, b, the shift register N also receives the output of a setting circuit P, by means of which the shift register N can be initially set.

The logic circuit L comprises a number of AND and OR logic elements which operate on the input signals d and e as well as the input switching pulses $f1$ to $f12$ and $g1$ to $g12$ to develop the firing signals $z11$ to $z16$ for the main valves $n21$ to $n26$ of the second inverter $w2$. The design of the logic circuit L may be conventional and as desired, as long as it is able, through logical interlinking, to furnish the firing signals $z11$, $z14$, $z12$, $z15$ as well as $z21$, $z24$, $z22$ and $z25$, as shown in FIG. 7.

Figure 7:
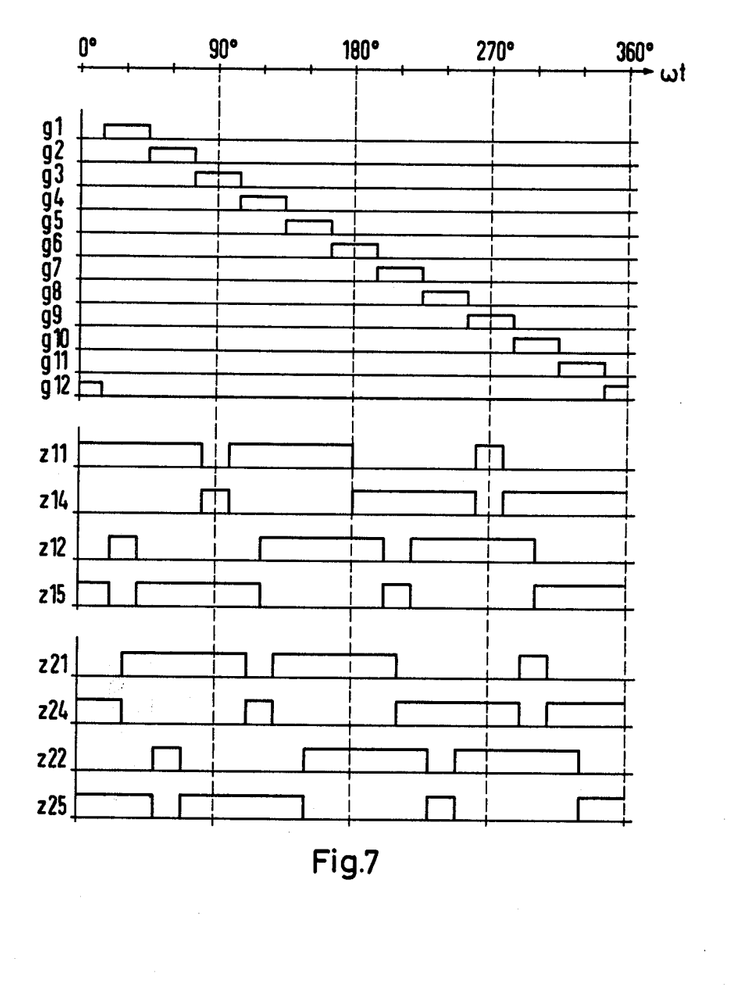
FIG. 7 shows the waveforms of further signals appearing in the control unit of FIG. 5.

Closer consideration of the waveform of the firing signals $z11$ and $z14$ in FIG. 7 shows that they are mutually inverse. This means that, as long as the main valve $n11$ is fired, the adjacent main valve $n14$ is blocked, and vice versa. Moreover, the firing and extinguishing points are chosen such that the waveshape of the AC voltage U(RL, M') shown in diagram 2 of FIG. 2 appears. The waveform of the firing signal $z11$ is obtained from the following relation, given in Boolean notation:

$$z11 = f1 \vee f2 \vee g2 \vee (g3 \wedge e) \vee g4 \vee f5 \vee f6 \vee (g8 \wedge d) \qquad (1)$$

The waveform of the firing signal $z14$, in turn, is the negative of the relation of the firing signal $z11$ and is given as follows:

$$z14 = \overline{z11} \qquad (2)$$

The waveform of the firing signal $z12$, which is phase-shifted by 120° el to the right relative to the waveform of the firing signal $z11$, can also be represented in Boolean notation by the following expression:

$$z12 = (g1 \wedge d) \vee f5 \vee f6 \vee g6 \vee (g7 \wedge e) \vee g8 \vee f9 \vee f10 \qquad (3)$$

Similarly, the negative of equation (3) represents the waveform of the inverse firing signal $z15$ and can be written as follows:

$$z15 = \overline{z12} \qquad (4)$$

As can be shown, the two firing signals $z12$ and $z15$ furnish the AC voltage U(S1, M') whose waveform is shown in diagram 3 in FIG. 2. Similar relations can also be straightforwardly derived for the firing signals $z13$, $z16$, which are phase-shifted by another 120° el to the right relative to the firing signals $z12$ and $z15$.

FIG. 7 also shows the waveforms of the firing signals $z21$ and $z24$ for the two adjacent main valves $n21$ and $n24$ of the second inverter $w2$. As can be seen, these two firing signals $z21$ and $z24$ also mutually inverse. Moreover, their firing and extinguishing times have been chosen so that the waveform of the AC voltage U(R2, M') shown in diagram 7 of FIG. 2 results. The waveform of the firing signal $z21$ is derived from the following Boolean expression:

$$z21 = f2 \vee f3 \vee g3 \vee (g4 \wedge e) \vee g5 \vee f6 \vee f7 \vee (g10 \wedge d) \qquad (5)$$

The expression for the firing signal $z24$ is obtained from the negative of the expression defining the signal $z21$ and can be written as follows:

$$z24 = \overline{z21}.$$

The firing signal z22, which is phase-shifted by 120° el to the right relative to the firing signal z21, can likewise be represented by the following Boolean relation:

$$z22 = (g1\ d)vf6vf7vg7v(g8e)\ vg9vf10vf11 \qquad (7)$$

Negating this relation furnishes the waveform of the inverse firing signal z25:

$$z25 = \overline{z22}. \qquad (8)$$

As before, similar relations can be derived for the remaining firing signals z23, z26 of the second inverter w2.

It should be pointed out that with the present inverter arrangement, the maximally obtainable control angle is $\alpha/2 = 15°$ el. Such an angle permits 50% of the DC input voltage $u$ to be adjusted which is sufficient for all known applications.

What is claimed is:

1. An inverter arrangement for use with a DC voltage source comprising:
    a first inverter having an input adapted to be connected to said DC source, exactly six main valves arranged in a first three-phase bridge arrangement, and first quenching devices for quenching said first main valves, and said first inverter providing a first three-phase system of inverter output voltages which are each of a rectangular waveshape and are phase-shifted by 120° el relative to each other;
    a second inverter having an input adapted to be connected to said DC source, exactly six main valves arranged in a second three-phase bridge arrangement, and second quenching devices for quenching said second main valves, said second inverter providing a second three-phase system of inverter output voltages which are phase-shifted, in the sense of a time lag, by 30° el and smaller in magnitude by a factor equal to $\sqrt{3}$ relative to said first system of voltages, said second system of voltages each being of rectangular waveshape and being phase-shifted by 120° el relative to each other;
    a combining means for combining said first and second systems of voltages to derive a three-phase system of resultant output voltages;
    a control unit for controlling said main valves and said quenching devices of said first and second inverters so as to fire and extinguish said main valves several times per period of said resultant voltages, and such that each of said inverter output voltages includes per period of said resultant voltages a positive voltage pulse and a negative voltage pulse which are separated from each other by a no-voltage interval of 60° el length, each of said pulses being of a 120° el length and having two no-voltage intervals whose widths are symmetrically adjustable relative to the center of the pulse and are spaced on opposite sides of said center at a distance of 30° el therefrom;
    said combining means combining one of said inverter voltages of said first system additively with a first inverter voltage of said second system, and subtractively with a second inverter voltage of said second system to generate one of said resultant voltages, said first inverter voltage being displaced 30° el relative to said one inverter voltage and said second inverter voltage being displaced 150° el relative to said one inverter voltage;
    and said combining means comprising:
    a first transformer which is connected to said first inverter, said first transformer having three primary windings which are delta connected and three secondary windings, and being connected in a Dy-connection; and
    a second transformer which is connected to said second inverter, said second transformer having three primary windings which are delta connected and having six secondary windings, and being connected in a Dz-connection and having a transformation ratio which is greater than the transformation ratio of said first transformer by a factor equal to $\sqrt{3}$;
    one of said first and second transformers having an open neutral point;
    the other of said first and second transformers having its neutral point connected as a neutral terminal for said three-phase system of resultant output voltages; and
    each of said secondary windings of said first transformer being connected in series with a series connection of two of said secondary windings of said second transformer.

2. An inverter arrangement in accordance with claim 1 in which said first transformer has a Dy5-connection and said second transformer a Dz6-connection.

3. An inverter arrangement in accordance with claim 1 in which said control means includes means for generating a DC control voltage for adjusting the no-voltage intervals of each of said pulses in the same sense and in a range from 0° to 30° el, means for generating a periodic synchronizing voltage, and means for deriving firing signals for said valves in dependence on the intersections of said DC control voltage with said synchronizing signal.

4. An inverter arrangement in accordance with claim 3 in which said means for deriving comprises:
    a comparison member which compares said adjustable DC voltage and said synchronizing voltage and produces output signals when said voltages are equal;
    a shift register for forming a set of mutually displaced switching pulses;
    a shifting unit responsive to said switching pulses for forming a set of mutually displaced delay switching pulses; and
    a logic circuit responsive to said output signals and to said sets of switching and delayed switching pulses for forming said firing signals.

5. An inverter arrangement in accordance with claim 4 in which:
    said switching pulses are each 30° el in length and are successively displaced by 30° el relative to each other;
    said delayed switching pulses are delayed in the sense of a time lag by 15° el relative to said switching pulses and are each of a 30° el length and displaced by 30° el relative to the next adjacent delayed pulse.

* * * * *